Patented July 25, 1950

2,516,258

UNITED STATES PATENT OFFICE 2,516,258

3,11-DIKETO-20,21-DIOXYPREGNANES AND PROCESS

Lewis H. Sarett, Princeton, N. J., assignor to Merck & Co., Inc., Rahway, N. J., a corporation of New Jersey No Drawing. Application August 2, 1946, Serial No. 687,980

16 Claims. (Cl. 260—397.4)

This invention is concerned generally with novel chemical compounds of the cyclopentanodimethylpolyhydrophenanthrene series and processes for preparing the same; more particularly it relates to stereoisomers of 3,11-diketo-20,21-dihydroxy-pregnane and acylated derivatives thereof and with methods of manufacturing these compounds from readily available starting materials. It is further concerned with methods of isolating said stereoisomers, namely 3,11-diketo-20-($\alpha$)-21-dihydroxy-pregnane and 3,11-diketo-20-($\beta$)-21-dihydroxy-pregnane and their acylated derivatives in substantially pure form. The new compounds thus produced are of value in the preparation of the adrenal hormones such as dehydro corticosterone, dehydrocorticosterone esters, and for other purposes. They are also of value as a means of establishing the structure of other organic compounds.

These stereoisomeric 3,11-diketo-20,21-dihydroxy-pregnanes and their acylated derivatives, subject of this application, can be represented by the following structural formulae:

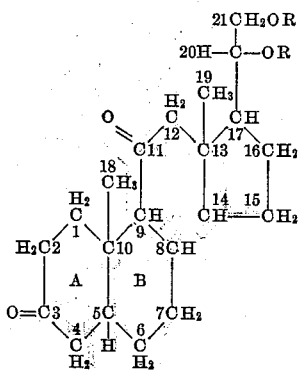

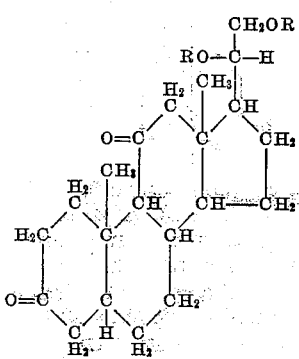

wherein R is hydrogen or acyl. This formula for purposes of convenience is hereinafter reproduced below in the abbreviated form:

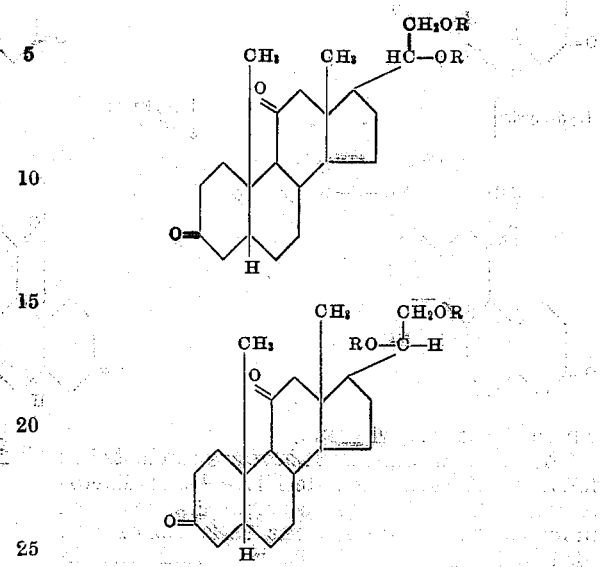

wherein R has the significance above defined.

In the following description of the invention, the stereochemical relationships of the substituents are indicated by the following convention:

(1) A substituent at the C$_{20}$ position is arbitrarily indicated as "$\alpha$" or "$\beta$," depending upon the stereochemical configuration thereof; in this application the convention is adopted that the $\beta$ configuration is represented by writing the C$_{20}$ substituent (hydroxyl or acyloxy) at the right of the C$_{20}$ carbon side chain thus:

and in the case of epimeric $\alpha$ configuration, the substituent is written to the left side of the side chain thus:

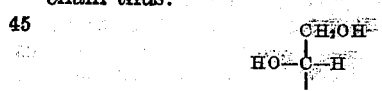

(2) The stereochemical relationship of rings A and B is indicated in the formulae by a solid line representing the valence bond in the cis configuration.

In accordance with the present invention, it is now found that 3,11-diketo-20,21-dihydroxy-pregnane and acylated derivatives thereof can be synthesized by reactions represented generically as follows:

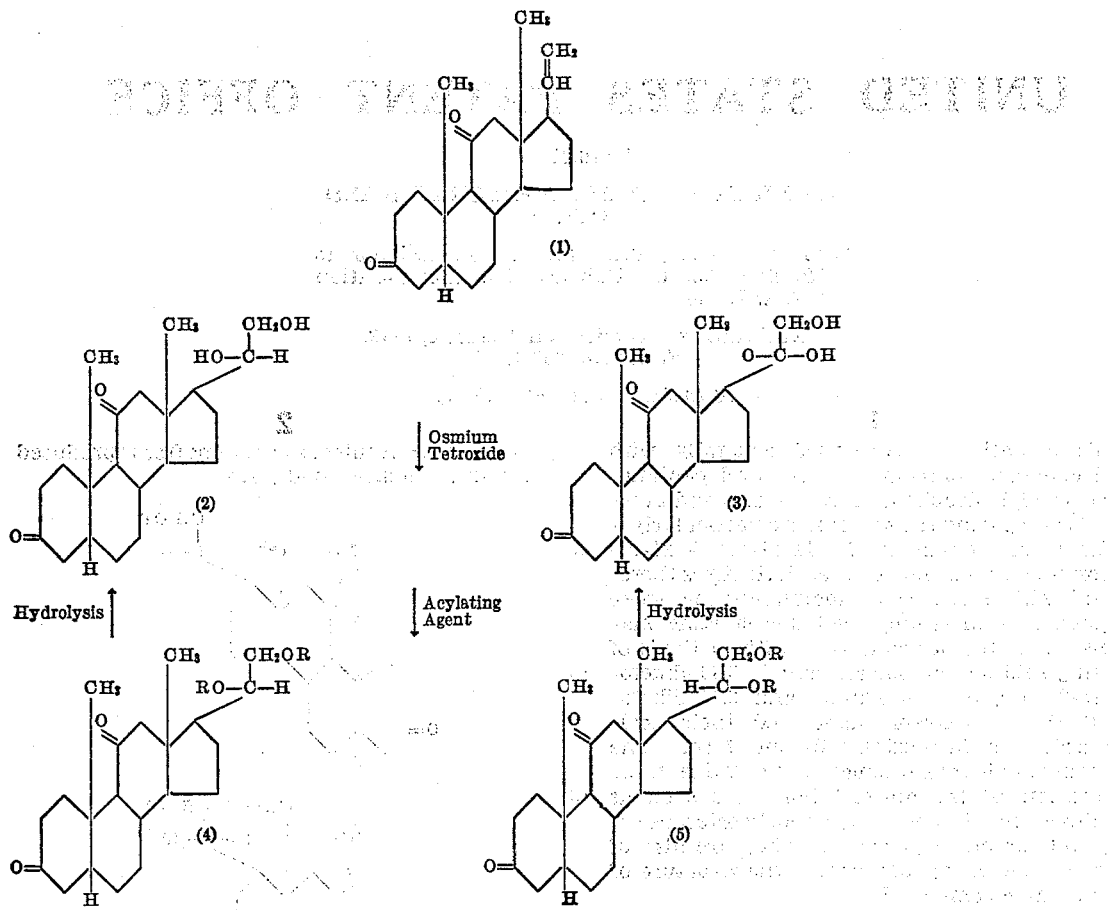

wherein R is an acyl group.

The reactions indicated above are conducted as follows: The starting material $\Delta^{20,21}$-3,11-diketopregnene (1) which can be prepared as disclosed in my co-pending applications, Serial No. 649,760, filed February 23, 1946 (which is a continuation in part of application Serial No. 605,194, filed July 14, 1945, now abandoned); and Serial No. 687,982, filed August 2, 1946, now Patent No. 2,505,838; is reacted with an agent capable of converting an olefinic bond to the corresponding glycol, such as, osmium tetroxide, or hydrogen peroxide in contact with a catylytic amount of osmium tetroxide, whereby the ethylenic linkage is converted to the corresponding glycol to produce a mixture of the stereoisomeric 3,11-diketo-20($a$),21-dihydroxypregnane (2) and 3,11-diketo-20($\beta$)-21-dihydroxy-pregnane (3). This mixture of isomers is reacted with an acylating agent to form the corresponding mixture of stereoisomers of 3,11-diketo-20,21-diacyloxy-pregnane (4 and 5). These isomers can be separated from each other, as for example, by means of chromatographic adsorption to produce the stereoisomers of 3,11-diketo-20-($a$)-21-diacyloxy-pregnane (4) and 3,11-diketo-20-($\beta$)-21-diacyloxy-pregnane (5) in substantially pure form. These pure stereoisomers can then be hydrolyzed to produce the corresponding pure isomers 3,11-diketo-20-($a$)-21-dihydroxy-pregnane (2) and 3,11-diketo-20-($\beta$)-21-dihydroxy-pregnane (3).

When the starting material, said $\Delta^{20,21}$-3,11-diketo-pregnene (1) is prepared according to the processes described in my co-pending applications hereinabove referred to, it is obtained admixed with the corresponding $\Delta^{17,20}$-isomer, compound 6 below, from which it is not readily separated.

Accordingly, I prefer to react said mixture of $\Delta^{17,20}$-3,11-diketo-pregnene and $\Delta^{20,21}$-3,11-diketo-pregnene (6), which can be represented by the following structural formulae:

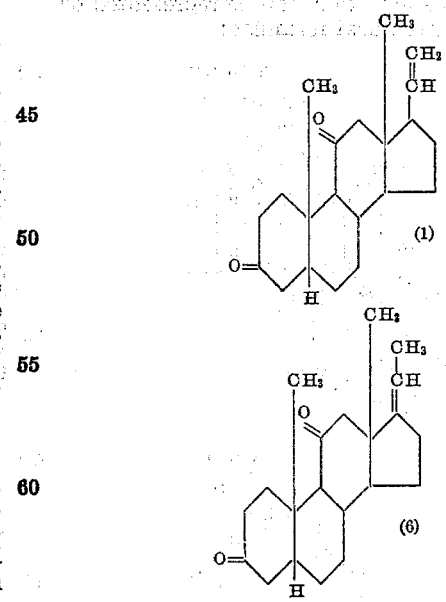

directly with osmium tetroxide; this is accomplished by dissolving said mixture in a substantially inert solvent, as for example, a dialkyl ether such as ethyl ether, and adding a solution of osmium tetroxide thereto. A tertiary amine, such as pyridine, quinoline, picoline, and the like, may then be added to this solution and the mixture allowed to react preferably at a temperature between about 0 and 20° C. The reaction mixture is allowed to stand for considerable time at about 0° C. to complete crystallization of the osmate esters which are removed by filtration and then hydrolyzed by treating with an aqueous solution of an alkaline reducing agent, as for example, sodium sulfite. The hydrolysis mixture is filtered and the filtrate evaporated to small volume and the mixture of stereoisomeric glycols extracted therefrom by means of a chlorinated hydrocarbon solvent, such as chloroform, ethylene dichloride, and the like; the solvent is then evaporated to produce a crude mixture containing 3,11-diketo-20-($\alpha$)-21-dihydroxy-pregnane (2), 3,11-diketo-20-($\beta$)-21-dihydroxy-pregnane (3), and 3,11-diketo-17,20-dihydroxy-pregnane (7), represented by the following structural formulae:

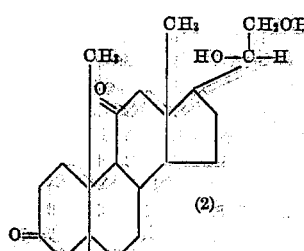

(2)

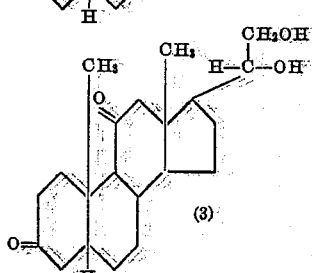

(3)

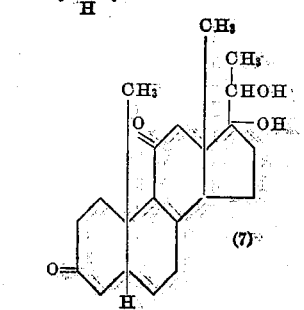

(7)

The mixture of diketo-dihydroxy pregnanes is then treated with a cyclic anhydride of a dicarboxylic acid, as for example, succinic anhydride or phthalic anhydride. The reaction can be conducted at room temperature, but is best carried out by heating the reactants at about 90–100° C. in the presence of an anhydrous alkaline medium, preferably a tertiary amine such as pyridine, quinoline, picoline and the like whereby the primary hydroxyl groups present in the stereoisomers of 3,11-diketo-20,21-dihydroxy-pregnane, are preferentially esterified. The reaction mixture is mixed with water to destroy unreacted anhydride and the resulting mixture is evaporated substantially to dryness, preferably under reduced pressure. The residual material, which consists of the isomeric 3,11-diketo-20-hydroxy-21-(carboxy-acyloxy)-pregnane admixed with unesterified 3,11-diketo-17,20-dihydroxy-pregnane is treated with an aqueous alkaline solution such as aqueous sodium carbonate solution and a water-immiscible solvent, such as a chlormated hydrocarbon solvent, a hydrocarbon solvent, and the like. The aqueous layer which contains the salts of the half esters of the desired stereoisomeric 3,11-diketo-20,21-dihydroxy-pregnane is separated from the non-aqueous solution which contains the 17,20-dihydroxy isomer. This aqueous solution is then acidified with an aqueous solution of a mineral acid and the stereoisomeric half-esters, 3,11-diketo-20-($\alpha$)-hydroxy-21-(carboxy-acyloxy)-pregnane (8), and 3,11-diketo-20-($\beta$)-21-(carboxy-acyloxy)-pregnane (9), are extracted therefrom with a solvent of the class previously mentioned. Evaporation of this solvent extract yields a mixture of these half esters, which can be represented by the following structural formulae:

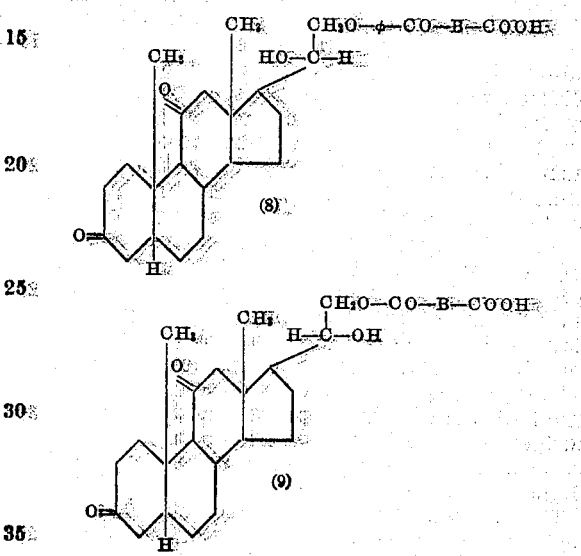

(8)

(9)

wherein B is an alkylene, arylene, or aralkylene radical.

This product can be hydrolyzed by any convenient method as for example, by reacting with an aqueous alkaline solution to produce the corresponding mixture of the stereoisomeric 3,11-diketo-20-($\alpha$)-21-dihydroxy-pregnane (2), and 3,11-diketo-20-($\beta$)-21-dihydroxy-pregnane (3), substantially free of the 3,11-diketo-17,20-dihydroxy pregnane isomer.

This mixture of stereoisomers is reacted with an excess of an acylating agent, preferably in the presence of a tertiary amine such as pyridine, quinoline, picoline and the like to form the corresponding mixture of stereoisomers of 3,11-diketo-20,21-diacyloxy-pregnane represented by the following structural formula:

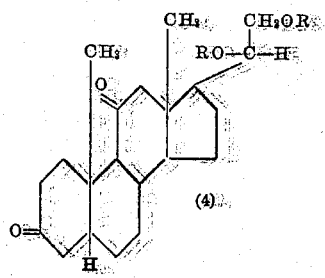

(4)

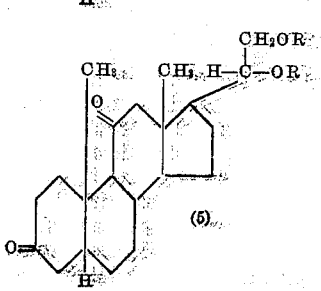

(5)

wherein R is acyl. Among the acylating agents which are useful for this purpose, are aliphatic anhydrides such as acetic anhydride, propionic anhydride, butyric anhydride, valeric anhydride and the like, organic acyl halides such as acetyl chloride, propionyl chloride, butyryl chloride, benzoyl chloride, and the like. If desired, the corresponding acid may be substituted in whole or in part for the anhydride used, but the anhydride is preferred.

The mixture of the stereoisomers of 3,11-diketo-20,21-diacyloxy pregnane can be converted without further purification to an ester of dehydrocorticosterone, but it is presently preferred to separate these epimers from each other and in substantially pure form. This can be accomplished by any convenient means, as for example, by fractional crystallization or by chromatographic absorption from a hydrocarbon solvent such as benzene, toluene, solvent naphtha, petroleum ether, and the like, or preferably from a mixture of solvents such as benzene-petroleum ether. The absorbing medium employed can be any of those commonly used for this purpose, but it is presently preferred to use activated alumina; the epimeric pregnane compounds are preferentially eluted from the absorbent by means of a selective solvent, such as a mixture of ether petroleum ether followed by ether-chloroform. The individual epimers separated in this way are purified by recrystallization from a solvent such as acetone, aqueous acetone, ether or lower aliphatic alcohols.

The individual epimeric 3,11-diketo-20,21-diacyloxy-pregnane obtained as described above, can be converted to the corresponding epimers of 3,11-diketo-20,21-dihydroxy-pregnane by reaction with a hydrolyzing agent under saponifying conditions. Hydrolyzing agents operable in applicants process include alkali or alkaline earth hydroxides, alkali carbonates or bicarbonates, mineral acids, and the like which can be used in water or aqueous organic solvent solution; it is presently preferred to employ an aqueous methanol solution containing potassium carbonate and potassium bicarbonate.

The following examples illustrate methods of carrying out the present invention, but it is to be understood that these examples are given by way of illustration and not of limitation.

Example 1

About 9.65 g. of a mixture containing $\Delta^{17,20}$- and $\Delta^{20,21}$-3,11-diketo-pregnene is dissolved in about 50 cc. absolute ether and a solution containing about 8.0 g. of osmium tetroxide in about 50 cc. of absolute ether is added thereto. About 2.4 cc. of pyridine is then added and the mixture is allowed to stand at about 20° C. for approximately 1 hour and then at about 0° C. for approximately 36 hours. The precipitated osmate esters are removed by filtration, suspended in about 350 cc. of alcohol and a solution of about 55 g. of sodium sulfite in about 240 cc. of hot water is added thereto and the mixture refluxed for approximately 3½ hours. The mixture is then filtered and the insoluble material extracted twice with approximately 200 cc. portions of hot alcohol and the alcohol extracts combined with the initial filtrate. This filtrate is then evaporated under reduced pressure to a small volume, diluted with water and extracted with chloroform. The chloroform layer is washed with water and evaporated to dryness under reduced pressure to produce a crude mixture which contains 3,11-diketo-17,20-dihydroxy-pregnane; 3,11-diketo-20-($\alpha$)-21-dihydroxy-pregnane and 3,11-diketo-20-($\beta$)-21-dihydroxy-pregnane.

Example 2

The separation of 3,11-diketo-17,20-dihydroxy-pregnane from the stereoisomeric 3,11-diketo-20,21-dihydroxy-pregnanes is achieved by dissolving about 9.05 g. of the mixture in about 25 cc. of pyridine, heating the solution to about 95° C. and adding thereto about 5.0 g. of succinic anhydride. The mixture is heated at about 95° C. for approximately 15 minutes additonal time, about 5 cc. of water is added to the hot solution to decompose excess succinic anhydride and the pyridine is then evaporated therefrom under reduced pressure. The residual material is dissolved in chloroform, the chloroform solution is washed with dilute hydrochloric acid to remove traces of pyridine, then with water, and the hemisuccinates of the stereoisomeric 3,11-diketo-20,21-dihydroxy-pregnanes are finally extracted therefrom as their potassium salts, by means of a 10% aqueous potassium carbonate solution.

The aqueous potassium carbonate extracts are combined, acidifed with dilute hydrochloric acid and extracted with chloroform. The chloroform extract is washed with water and evaporated to dryness under reduced pressure to produce about 7.2 g. of a mixture containing crude 3,11-diketo-20-($\alpha$)-hydroxy-21-($\beta$-carboxy-propionoxy)-pregnane and 3,11-diketo-20-($\beta$)-21-($\beta$-carboxy-propionoxy)-pregnane. This mixture, containing about 7.2 g. of hemisuccinates is saponified by dissolving in about 75 cc. of water containing about 1.3 g. of potassium bicarbonate and about 7.5 g. of potassium carbonate and heating the resulting solution on the steam bath for approximately ½ hour. The oily precipitate of dihydroxy-diketo-pregnanes and unsaponified potassium salts is then redissolved by addition thereto of about 150 cc. of a 1% methanolic sodium hydroxide solution. This solution is allowed to stand at about 20° C. for approximately 18 hours, the solution is evaporated to small volume under reduced pressure, and extracted with chloroform. The chloroform layer is washed with water and evaporated to dryness to produce about 5.2 g. of a crude mixture containing 3,11-diketo-20-($\alpha$)-21-dihydroxy-pregnane and 3,11-diketo-20-($\beta$)-21-dihydroxy-pregnane.

Example 3

The crude mixture of stereoisomeric diketo-dihydroxy-pregnanes is separated by the following procedure: About 5.2 g. of the crude mixture of diketo-dihydroxy-pregnanes obtained above is dissolved in a solution containing about 10 cc. of pyridine and about 10 cc. of acetic anhydride and the solution is heated on the steam bath for approximately ½ hours. The solution is cooled, about 30 cc. of water is added thereto and the resulting solution evaporated to small volume under reduced pressure. The residual material is extracted with benzene and the benzene extract is washed successively with dilute hydrochloric acid, dilute aqueous potassium carbonate solution, and water. The benzene solution is evaporated to dryness under reduced pressure to produce about 6.2 g. of a crude mixture containing 3,11-diketo-20-($\alpha$ and $\beta$)-21-diacetoxy-pregnanes. These are separated chromatographically by dissolving in benzene, adding petroleum ether to the benzene solution until the latter becomes turbid and then absorbing on a column of alumina previously activated by heating at 150° C. The elution is conducted by adding successive portions of solvent mixtures, beginning with 1:1-petroleum ether: ether, proceeding through higher concentrations of ether to pure ether and finally eluting with ether-chloroform mixtures of increasing chloroform content. Each eluate is evaporated to dryness by itself and crystalline residues having similar properties are combined.

The group eluates from 1:9 - petroleum ether:ether up to and including 6:4-ether: chloroform contains 3,11-diketo-20-($\beta$)-21-diacetoxy-pregnane which is purified by recrystallization from dilute acetone; M. P. 174.5–175.0° C. (corr.); $a_D^{25}=+74°$ (acetone). The group eluates from 6:4-ether:chloroform to 2:8-ether:chloroform contains 3,11-diketo-20-($\alpha$)-21-diacetoxy-pregnane. Recrystallization of the crude material from ethyl acetate yields the pure diacetate; M. P. 181° C. (corr.); $a_D^{25}=+45°$ (acetone).

The 3,11-diketo-20-($\beta$)-21-diacetoxy-pregnane is saponified by dissolving about 490 mg. of the compound in a mixture containing about 20 cc. methanol, about 10 cc. water, about 300 mg. potassium carbonate and about 650 mg. potassium bicarbonate and allowing the resulting solution to stand at about 20° C. for approximately 22 hours. The resulting solution is evaporated under reduced pressure to a small volume to produce a crystalline precipitate which is centrifuged, washed and purified by recrystallization from a small volume of acetone, to produce substantially pure 3,11-diketo-20-($\beta$)-21-dihydroxypregnane; M. P. 168–168.5° C. (corr.); $a_D^{25}=+61.5°$ (acetone).

A sample of the 3,11-diketo-20-($\alpha$)-21-diacetoxy-pregnane (M. P. 181° C.) prepared above is saponified in the manner described for the hydrolysis of the 20-($\beta$)-derivative, the product isolated and purified by recrystallization from acetone as therein described to produce substantially pure 3,11-diketo-20-($\alpha$)-dihydroxy-pregnane; M. P. 182–183° C. (corr.); $a_D^{25}=+68.5°$ (acetone).

Various changes and modifications may be made in the present invention as described without departing from the spirit and scope thereof. To the extent that these changes and modifications are within the purview of the annexed claims, they are to be considered as part of my invention.

I claim:

1. The process which comprises reacting a mixture containing $\Delta^{20,21}$-3,11-diketo-pregnene and $\Delta^{17,20}$-3,11-diketo-pregnene with a compound selected from the class which consists of osmium tetroxide and hydrogen peroxide to produce a mixture containing 3,11-diketo-20-($\alpha$)-21-dihydroxy - pregnane, 3,11 - diketo - 20 - ($\beta$) - 21 - dihydroxy-pregnane and 3,11-diketo-17,20-dihydroxy-pregnane; reacting this mixture with a cyclic anhydride of a dicarboxylic acid to convert the 20,21-dihydroxy compounds to the corresponding 3,11 - diketo - 20 - hydroxy - 21 - (carboxy-acyloxy)-pregnanes admixed with unchanged 3,11-diketo-17,20-dihydroxy-pregnane; separating the half esters from this mixture; hydrolyzing said half-esters to produce a mixture of the corresponding 3,11-diketo-20,21-dyhydroxy-pregnanes substantially uncontaminated by the 17,20-dihydroxy isomer; reacting this mixture with a compound selected from the class which consists of benzoyl chloride, lower aliphatic carboxylic acid anhydrides and lower aliphatic carboxylic acid halides, to produce a mixture containing the corresponding 3,11-diketo-20-($\alpha$)-21-diacyloxy-pregnane and 3,11-diketo-20-($\beta$)-21-diacyloxy pregnane; and separating these isomers to produce the individual stereoisomers, 3,11 - diketo - 20($\alpha$),21 - diacyloxy-pregnane and 3,11-diketo-20($\beta$),21-diacyloxy-pregnane.

2. The process which comprises reacting a mixture containing $\Delta^{20,21}$-3,11-diketo-pregnene and $\Delta^{17,20}$ - 3,11 - diketo - pregnene with osmium tetroxide to produce a mixture containing 3,11-diketo - 20 - ($\alpha$) - 21 - dihydroxy - pregnane, 3,11 - diketo - 20 - ($\beta$) - 21 - dihydroxy - pregnane and 3,11 - diketo - 17,20 - dihydroxy - pregnane; reacting this mixture with succinic anhydride and pyridine to convert the 3,11-diketo-20,21-dihydroxy-pregnane isomers to the corresponding 3,11 - diketo - 20 - hydroxy - 21 - ($\beta$ - carboxy-propionoxy)-pregnanes admixed with unchanged 3,11 - diketo - 17,20 - dihydroxy-pregnane; separating the half esters from this mixture by selective extraction with an aqueous alkaline solution, hydrolyzing said half-esters to produce a mixture of the corresponding 3,11-diketo-20,21-dihydroxy-pregnanes substantially uncontaminated by the 17,20-dihydroxy isomer; reacting this stereoisomeric mixture of 3,11-diketo-20,21-dihydroxy-pregnane with acetic anhydride and pyridine to produce a mixture containing 3,11 - diketo - 20 - ($\alpha$) - 21 - diacetoxy pregnane and 3,11-diketo-20-($\beta$)-21-diacetoxy pregnane and separating this mixture of stereoisomers by chromatographic absorption to produce the individual stereoisomers, 3,11-diketo-20-($\alpha$),21-diacetoxy-pregnane and 3,11-diketo-20-($\beta$),21-diacetoxy-pregnane in substantially pure form.

3. The process which comprises reacting a cyclic anhydride of a dicarboxylic acid with a mixture containing 3,11-diketo-20,21-dihydroxy-pregnane and 3,11-diketo-17,20-dihydroxy-pregnane to produce a mixture comprising the corresponding 3,11-diketo-20-hydroxy-21-(carboxy-acyloxy)-pregnane admixed with unreacted 3,11-diketo-17,20-dihydroxy-pregnane, and separating the 3,11-diketo-20-hydroxy-21-(carboxy-acyloxy)-pregnane from this mixture.

4. The process which comprises reacting succinic anhydride and pyridine with a mixture containing 3,11 - diketo - 20,21 - dihydroxy - pregnane and 3,11-diketo-17,20-dihydroxy-pregnane to produce a mixture comprising 3,11-diketo-20-hydroxy - 21 - ($\beta$ - carboxy - propionoxy) - pregnane admixed with unchanged 3,11-diketo-17,20-dihydroxy-pregnane, and separating the 3,11 - diketo - 20 - hydroxy - 21 - ($\beta$ - carboxy - propionoxy)-pregnane from this mixture by extracting a solvent solution of said mixture with an aqueous alkaline solution.

5. The process which comprises reacting 3,11-diketo-20,21-dihydroxy-pregnane with a cyclic anhydride of a dicarboxylic acid to produce 3,11-diketo - 20 - hydroxy - 21 - (carboxy - acyloxy) - pregnane.

6. The process which comprises reacting a mixture containing 3,11-diketo-20($\alpha$),21-dihydroxy-pregnane and 3,11-diketo-20($\beta$),21-dihydroxy-pregnane with an excess of an acylating agent to produce a mixture of the corresponding 3,11-diketo-20($\alpha$),21-diacyloxy-pregnane and 3,11-diketo-20($\beta$),21-diacyloxy-pregnane and separating these compounds from each other by chromatographic adsorption.

7. The process of preparing 3,11-diketo-20-

(α)-21-diacetoxy-pregnane from a mixture containing 3,11 - diketo - 20(α),21 - dihydroxy - pregnane and 3,11-diketo-20(β),21-dihydroxy-pregnane which comprises reacting said mixture with an excess of acetic anhydride and pyridine to produce the corresponding mixture containing 3,11 - diketo - 20(α),21 - diacetoxy - pregnane and 3,11 - diketo - 20(β),21 - diacetoxy - pregnane; and separating the desired 3,11-diketo-20-(α)-21-diacetoxy-pregnane from said mixture by chromatographic absorption.

8. The process of preparing 3,11-diketo-20-(β)-21-diacetoxy-pregnane from a mixture containing 3,11 - diketo - 20(α),21 - dihydroxy - pregnane and 3,11-diketo-20(β),21-dihydroxy-pregnane which comprises reacting said mixture with an excess of acetic anhydride and pyridine to produce the corresponding mixture containing 3,11 - diketo - 20(α),21 - diacetoxy - pregnane and 3,11 - diketo - 20(β),21 - diacetoxy - pregnane; and separating the desired 3,11-diketo-20-(β) - 21-diacetoxy-pregnane from said mixture by chromatographic absorption.

9. 3,11-diketo-20,21-dihydroxy-pregnane.

10. 3,11-diketo-20-(β)-21-dihydroxy-pregnane having, when in substantially pure form, a melting point of about 168° C., and an $α_D^{25}$ approximately equal to 6.5° in acetone.

11. 21 - substituted-3,11 - diketo - 20 - hydroxy-pregnanes in which the substituent in the 21-position has the formula RCOO—, wherein R is a beta-carboxy-substituted lower alkyl radical.

12. 3,11 - diketo - 20 - hydroxy - 21 - (β - carboxy-propionoxy)-pregnane.

13. 3,11-diketo-20-(β)-21-diacetoxy-pregnane having, when in substantially pure form, a melting point of about 175° C., and an $α_D^{25}$ approximately equal to +74° in acetone.

14. 3,11-diketo-20,21-diacetoxy-pregnane.

15. The process which comprises reacting 3,11-diketo-20,21-dihydroxy-pregnane with succinic anhydride and pyridine to produce 3,11-diketo-20 - hydroxy - 21 - (β - carboxy - propionoxy) - pregnane.

16. Lower aliphatic carboxylic acid esters of 20,21-dihydroxy-3,11-diketo-pregnane.

LEWIS H. SARETT.

REFERENCES CITED

The following references are of record in the file of this patent:

UNITED STATES PATENTS

| Number | Name | Date |
|---|---|---|
| 2,152,625 | Dirscherl | Apr. 4, 1939 |
| 2,167,132 | Weisz | July 25, 1939 |
| 2,183,589 | Reichstein | Dec. 19, 1939 |
| 2,254,562 | Bockmuhl | Sept. 2, 1941 |
| 2,283,411 | Bretschneider | May 19, 1942 |
| 2,312,344 | Logemann | Mar. 2, 1943 |

FOREIGN PATENTS

| Number | Country | Date |
|---|---|---|
| 816,852 | France | May 10, 1937 |